Feb. 6, 1951 T. A. ST. CLAIR 2,540,699
LIQUID LEVEL GAUGE WITH DEFLECTOR
Filed July 7, 1949 2 Sheets-Sheet 1
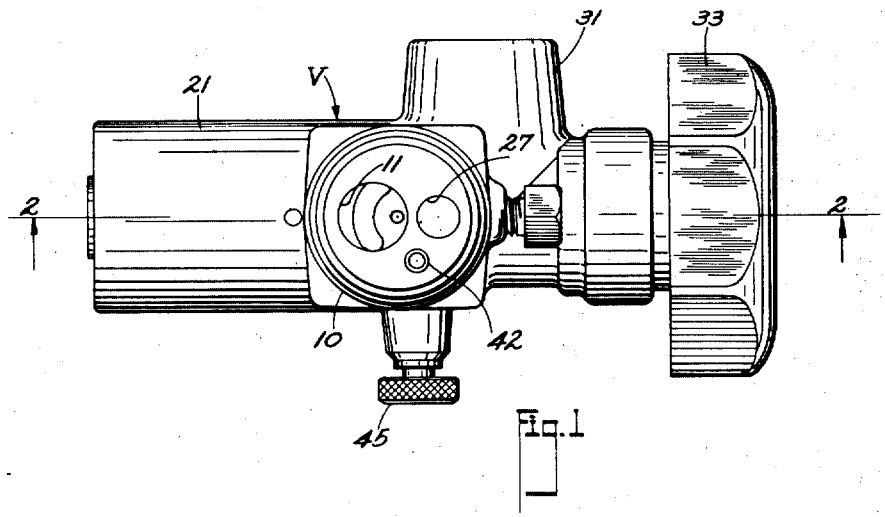
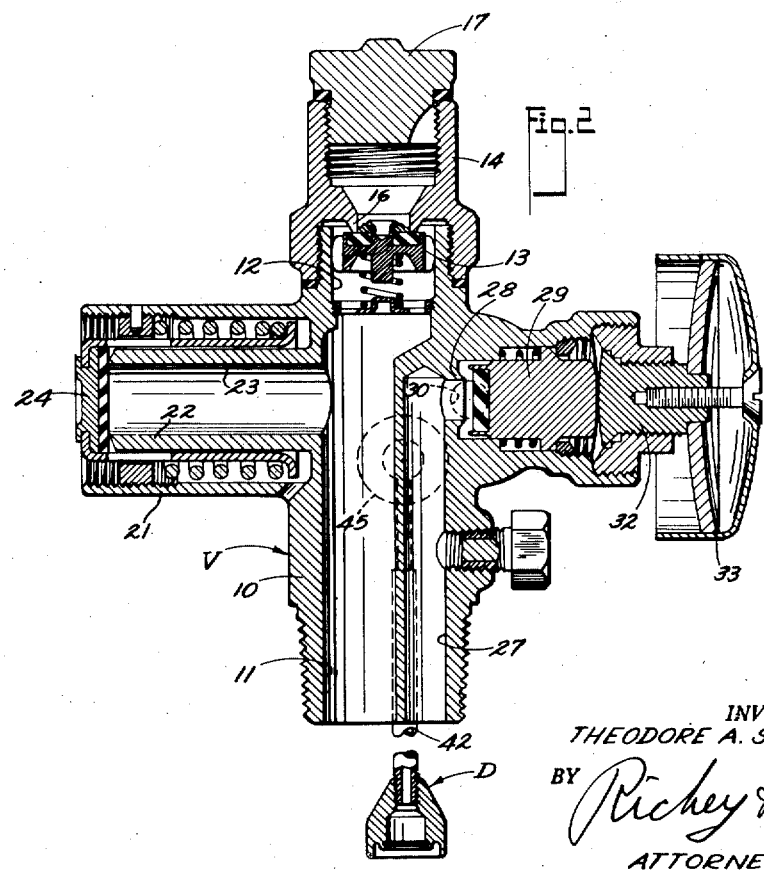
INVENTOR.
THEODORE A. ST. CLAIR
BY Richey & Watts
ATTORNEYS Feb. 6, 1951     T. A. ST. CLAIR     2,540,699
LIQUID LEVEL GAUGE WITH DEFLECTOR
Filed July 7, 1949     2 Sheets-Sheet 2
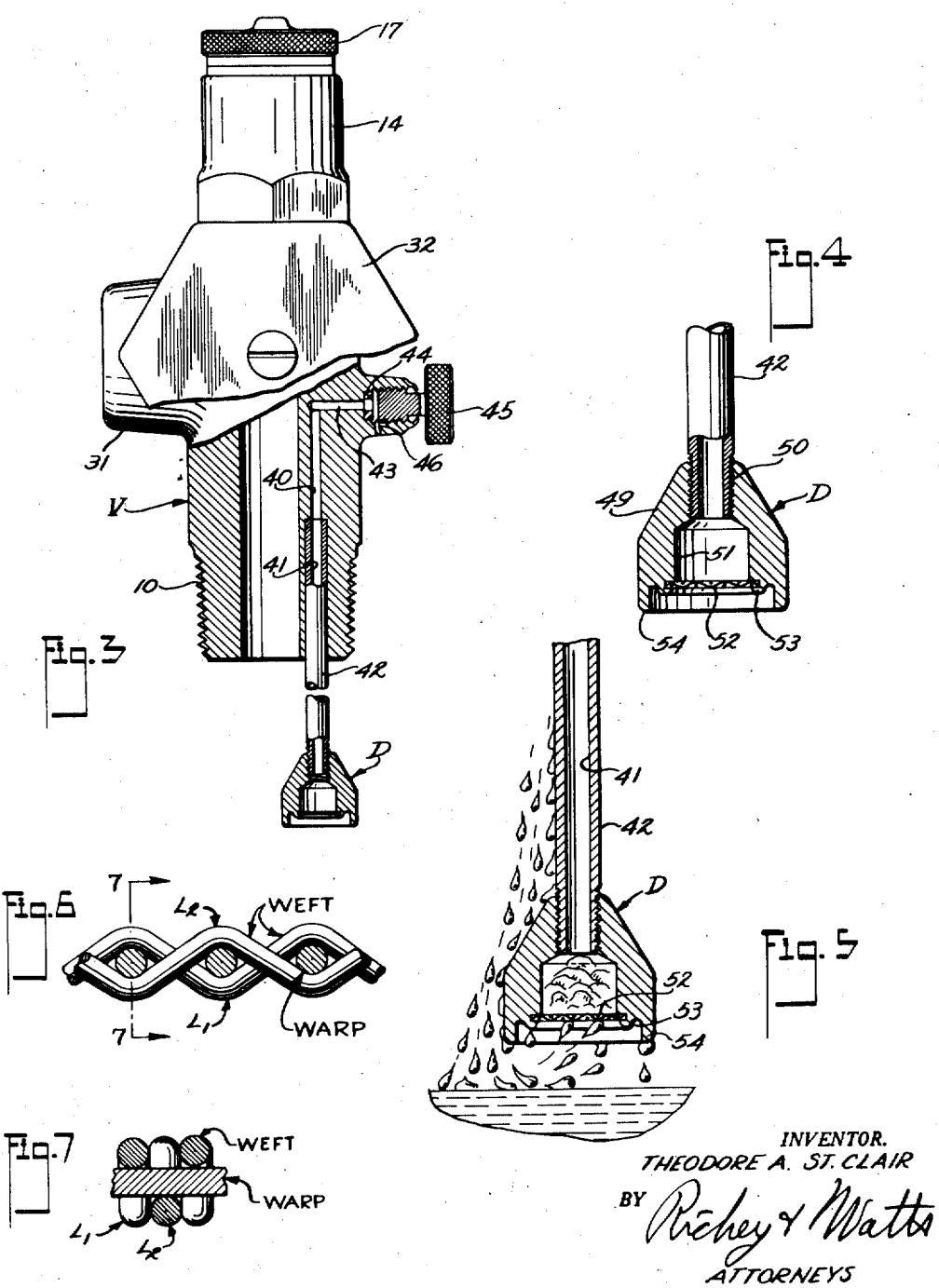
INVENTOR.
THEODORE A. ST. CLAIR
BY Richey & Watts
ATTORNEYS Patented Feb. 6, 1951

2,540,699

UNITED STATES PATENT OFFICE 2,540,699

LIQUID LEVEL GAUGE WITH DEFLECTOR

Theodore A. St. Clair, East Cleveland, Ohio, assignor to The Weatherhead Company, Cleveland, Ohio, a corporation of Ohio Application July 7, 1949, Serial No. 103,357

9 Claims. (Cl. 62—1)

This invention relates to dispensing systems for liquefied petroleum gas and the like, and, more particularly, to means for filling and gauging the maximum level in a tank or container for the liquid.

It is customary in certain phases of the art of handling liquefied petroleum gas to store it in tanks or containers which are regularly filled and emptied. In filling the containers it is desirable and necessary, from a standpoint of safety, to leave a vapor space above the maximum liquid level. One means for insuring that the filling operation will be stopped before the tank is completely filled includes a gauge tube which extends below the top of the tank by a distance representing the desired height of vapor space in the tank. During the filling operation the valve normally closing the upper end of the tube from atmosphere is opened. As liquid enters the tank only gas escapes from the tube, but when the liquid level reaches the tube further entry of liquid seals off the vapor chamber and vapor pressure forces liquid up out of the tube, giving visual indication that the tank is properly filled.

Considerable difficulty has been experienced in prior fill gauge devices of the type referred to, particularly where the gauge is incorporated in the fill valve itself. Liquid entering the tank flows down along the tube and when it reaches the open end thereof is readily aspirated into the tube giving a false indication that the filling operation should be stopped. Bending the tube away from the flow of liquid does not solve this problem entirely because the liquid flows along the tube from the filling entrance. Difficulty is also encountered when the tank approaches its full condition from liquid that splashes from the surface of the liquid level and is drawn or aspirated into the gauge tube.

It is an object of the present invention to prevent aspiration of liquid into the tube before the tank is full, thereby precluding false indications from the fill gauge outlet. This is accomplished by providing a fill valve and gauge assembly which includes a deflector attached to the lower end of the gauge tube that is arranged to prevent false indications of the fluid level.

In the preferred construction the deflector takes the form of a flared skirt having a mouth of greater diameter than that of the gauge tube. Concentric drip ledges surround a screen that lies across the mouth. The concentric drip ledges tend to protect the mouth from drops of liquid which otherwise tend to enter the device and tend to collect the drops and facilitate their falling clear of the deflector. The mouth, being larger than the tube, causes reduction in gas velocity by reducing the aspirating effect of the deflector, and the screen serves the dual purpose of preventing direct entrance of droplets into the tube and of serving as an evaporator for droplets that impinge upon the screen. With this construction the gauge tube may be made a part of the fill valve and may be made straight. Despite the fact that incoming liquid flows around and adjacent the gauge tube, none is aspirated therein and accurate indications of fluid level are maintained.

A clearer understanding of how these advantages may be obtained will be had from the following detailed description of a preferred embodiment of the invention.

In the drawings:

Fig. 1 is a bottom view of a fill valve embodying the invention with the deflector removed;

Fig. 2 is a section taken on 2—2 of Fig. 1;

Fig. 3 is a fragmentary section of Fig. 2;

Fig. 4 is an enlarged section through the deflector;

Fig. 5 is a view similar to Fig. 4 illustrating the principles of the action of the deflector during filling;

Fig. 6 is a greatly enlarged fragmentary section through the warp wires of the screen; and, Fig. 7 is a section on 7—7 of Fig. 6.

Figs. 1 to 3 show a fill valve including a gauge tube and deflector made in accordance with the invention. The valve V has a body including a nipple 10 formed with threads or any other suitable attaching means for connection with a tank or container. An inlet or filling bore 11 is provided in the body which communicates at its upper portion with an enlarged passageway 12 containing a spring-loaded poppet 13. A separate fill valve nipple 14 is threaded to the body and includes an inlet port surrounded by valve seat 16 normally engaged by poppet 13. A closure 17 may be provided when the tank is not being filled. It will be understood that the self-closing fill valves of the type described are known in the art and the details of the construction form no part of the invention, the valve only being illustrated in the interests of clarity.

In accordance with the usual practice, a relief valve is provided which may be formed as described in detail in the copending application of Andrew G. Johnson, Serial No. 94,383, filed May 20, 1949, and as described in the copending application of Theodore A. St. Clair, Serial No. 58,563, filed November 5, 1948, now Patent No. 2,527,381. Briefly, the valve may include a sleeve 21 that acts as a spring guide for the relief valve spring and an inner stem 22 having a bore 23 in communication with the bore 11 enclosed by the movable valve member 24, the details of the valve construction forming no part of the invention.

It is usual to include a dispensing means in the fill valve which, in the form shown, may be arranged to provide a dispensing bore 27 in the body for communication with an outlet port 28 which may be closed by valve member 29 to block communication from the outlet passage 30 in communication with an internally threaded outlet nipple 31. The construction is of the packless type and includes a threaded operating button 32 and the handle 33. Again, details of the dispensing valve construction form no part of the invention.

In the valve of applicant's invention the fill gauge tube may be incorporated as part of the fill valve without danger of liquid aspiration into the tube. Thus, a bore 40 formed in the valve body communicates with a gauge tube fastened by any suitable manner in a somewhat enlarged bore 41 in the valve body. The gauge tube 42 has mounted at its lower end a deflector element D. The upper end of bore 40 communicates with a transverse bore 43 which may be closed by a movable valve member including a rubber disc 44 and a manual member 45, liquid emerging from bleed hole 46 when the tank has filled. The construction of the valve member is not critical to the invention, a suitable and satisfactory arrangement being disclosed in the copending application of Andrew G. Johnson, Serial No. 94,383, filed May 20, 1949.

The construction of the deflector is best seen in Fig. 4. It includes a flaring skirt having a tapered external fluid deflecting surface 49, the upper portion of the deflector being threaded or otherwise fastened to the lower end of the gauge tube 42 as at 50. The mouth 51, of greater diameter than the tube 42, communicates with the tube, and a screen 52 is disposed across the mouth and is retained in the deflector by spinning over a lip 53 which serves the dual purpose of retaining the screen and acting as a drip-collecting ledge. The second drip-collecting ledge 54, of larger diameter than the first ledge 53, surrounds the screen and projects below the same. It is desirable that the screen 52 be so formed that it is virtually impenetrable to droplets but yet will pass liquid when submerged. For example, in carrying out the dimension I have found that this result is attainable by a screen having the following dimensions:

Diameter of screen—⅜ inches
Warp wires—.010 inch diameter, 30 per inch
Weft wires—.008 inch diameter, 125 per inch At first glance it would appear that the weft wires are packed solid and they are when viewed in an axial direction, the direction from which droplets are splashed against the screen. However, as seen in Figs. 6 and 7 (which shows the screen described enlarged 12 times) the separation of the weft wires by the more coarsely-spaced warp wires provides a tortuous path through the screen. For example, with the screen just described minute bodies of liquid may pass through the screen by moving upwardly between adjacent downward loops $L_1$ of one-half of the weft wires, then axially along the warp wires, and out between adjacent upward loops $L_2$ of the other half of the weft wires. Any liquid which so penetrates the screen when it is not submerged, is broken into such fine particles as to be almost a mist, and the heat conducted to the screen by pipe 42 readily evaporates this mist.

In operation, cap 17 is removed from the usual filling nozzle connected to the valve opening the poppet 13 whereupon liquid flows down through bore 11 and into the tank. As illustrated diagrammatically in Fig. 5, drops or droplets of fluid flow about and along the tube and the deflector. These drops or the film of fluid around the deflector tend to be aspirated into the tube. However, the mouth 51 is so much larger than the tube that the velocity of gas flow therethrough is reduced thereby reducing the aspirating effect. Furthermore, the drip ledges tend to collect the film of fluid flowing along the surface of the deflector into drops which have more mass than a film, and accordingly tend to drop clear of the deflector rather than to be aspirated therein. Finally, any droplets of liquid that do reach the screen (either by splashing from the surface of fluid or by the aspirating effect) are prevented from bodily entering the mouth of the tube.

The screen tends to make such droplets into fine particles or into a mist which increases the surface area many times so that the liquid evaporates from the screen and none can enter the tube to give a false reading. Thus, the cooperating ledges which prevent most of the fluid from reaching the screen, the screen itself which effectively evaporates the fluid that does reach the screen, and the large mouth 51 which reduces the aspirating effect all combine and interact to effectively and simply solve the problem of false reading in the gauge tube.

Although I prefer to incorporate the fill gauge with the filling and dispensing valve, in the broader aspects of my invention I do not contemplate being limited to a construction wherein the fill gauge is incorporated with the fill valve. However, this is a simple and convenient construction which has formerly given trouble as described herein, but by employing a deflector having the mode of operation disclosed the fact that incoming liquid flows about adjacent the fill gauge tube does not give any difficulty with false readings or level indications.

Having completed a detailed description of my invention, I contemplate that modifications thereof may be made without departing from the scope of the invention as defined in the appended claims.

What is claimed is:

1. For use on a container of liquefied petroleum gas, a fill valve comprising a valve body having means formed for attachment to the container, a fill passageway in said body, a fill-gauge tube extending away from said body, a fill-gauge bore and a valve closing said bore in said body, and a liquid deflector and vaporizer to prevent aspiration of liquid into said tube connected to the lower end of said fill-gauge tube, said deflector comprising a skirt-like member connected at its upper end to said tube and having a gas inlet mouth of substantially greater diameter than the inlet of said tube, a screen across said mouth, and a drip ledge surrounding said screen.

2. For use on a container of liquefied petroleum gas, a fill valve comprising a valve body having means formed for attachment to the container, a fill passageway in said body, a fill-gauge tube extending away from said body, a fill-gauge bore and a valve closing said bore in said body, and a liquid deflector and vaporizer to prevent aspiration of liquid into said tube connected to the lower end of said fill-gauge tube, said deflector comprising a skirt-like member connected at its upper end to said tube and having a gas inlet mouth of substantially greater diameter than the inlet of said tube, a screen across said mouth, a combined first drip ledge and screen retainer surrounding and retaining said screen across said mouth, and a second drip ledge of greater diameter than said first drip ledge surrounding said screen, said second drip ledge extending below said first drip ledge.

3. For use on a container of liquefied petroleum gas, a fill valve comprising a valve body having means formed for attachment to the container, a fill passageway in said body, a fill-gauge tube extending downwardly from said body, a fill-gauge bore and a valve closing said bore in said body, and a liquid deflector and vaporizer to prevent aspiration of liquid into said tube connected to the lower end of said fill-gauge tube, said deflector comprising a skirt-like member having a flaring external deflecting surface connected at its upper end to said tube, said deflector having a gas inlet mouth of substantially greater diameter than the inlet of said tube, a screen across said mouth a combined first drip ledge and screen retainer surrounding and retaining said screen across said mouth and a second drip ledge of greater diameter than said first drip ledge surrounding said screen, said second drip ledge extending below said first drip ledge.

4. For use on a container of liquefied petroleum gas, fill gauge means including a body having means formed for attachment to the container, a fill-gauge tube extending downwardly from said body, a fill-gauge bore and a valve closing said bore in said body, and a liquid deflector and vaporizer to prevent aspiration of liquid into said tube connected to the lower end of said fill-gauge tube, said deflector comprising a skirt-like member connected at its upper end to said tube and having a gas inlet mouth of substantially greater diameter than the inlet of said tube, a screen across said mouth, and a drip ledge surrounding said screen.

5. For use on a container of liquefied petroleum gas, fill gauge means including a valve body having means formed for attachment to the container, a fill passageway in said body, a fill-gauge tube extending downwardly from said body, a fill-gauge bore and a valve closing said bore in said body, and a liquid deflector and vaporizer to prevent aspiration of liquid into said tube connected to the lower end of said fill-gauge tube, said deflector comprising a skirt-like member connected at its upper end to said tube and having a gas inlet mouth of substantially greater diameter than the inlet of said tube, a screen across said mouth, a combined first drip ledge and screen retainer surrounding and retaining said screen across said mouth, and a second drip ledge of greater diameter than said first drip ledge surrounding said screen, said second drip ledge extending below said first drip ledge.

6. For use on a container of liquefied petroleum gas, fill gauge means including a body having means formed for attachment to the container, a fill passageway in said body, a fill-gauge tube extending downwardly from said body, a fill-gauge bore and a valve closing said bore in said body, and a liquid deflector and vaporizer to prevent aspiration of liquid into said tube connected to the lower end of said fill-gauge tube, said deflector comprising a skirt-like member having a flaring external deflecting surface connected at its upper end to said tube, said deflector having a gas inlet mouth of substantially greater diameter than the inlet of said tube, a screen across said mouth a combined first drip ledge and screen retainer surrounding and retaining said screen across said mouth and a second drip ledge of greater diameter than said first drip ledge surrounding said screen, said second drip ledge extending below said first drip ledge.

7. For use on a container of liquefied petroleum gas, a fill valve comprising a valve body having means formed for attachment to the container, a fill passageway in said body, a fill-gauge tube extending away from said body, a fill-gauge bore and a valve closing said bore in said body, and a liquid deflector and vaporizer to prevent aspiration of liquid into said tube connected to the lower end of said fill-gauge tube, said deflector comprising a skirt-like member connected at its upper end to said tube and having a gas inlet mouth of substantially greater diameter than the inlet of said tube, a screen across said mouth, and a drip ledge surrounding said screen, said screen being of woven wire construction with the weft threads substantially closer together than the warp threads whereby droplets splashed against the screen must take a tortuous path to traverse the screen.

8. For use on a container of liquefied petroleum gas, a fill valve comprising a valve body having means formed for attachment to the container, a fill passageway in said body, a fill-gauge tube extending downwardly from said body, a fill-gauge bore and a valve closing said bore in said body, and a liquid deflector and vaporizer to prevent aspiration of liquid into said tube connected to the lower end of said fill-gauge tube, said deflector comprising a skirt-like member connected at its upper end to said tube and having a gas inlet mouth of substantially greater diameter than the inlet of said tube, a screen across said mouth, and a drip ledge surrounding said screen, said screen being of woven wire construction with the weft threads substantially in contact and the warp threads spaced from one another whereby droplets splashed against the screen must take a tortuous path to traverse the screen.

9. For use on a container of liquefied petroleum gas, a fill valve comprising a valve body having means formed for attachment to the container, a fill passageway in said body, a fill-gauge conduit extending away from said body, a fill-gauge bore in said body and in communication with said conduit, a valve in said body closing said bore, said fill-gauge conduit comprising a tube extending away from said valve and terminating in means to prevent aspiration of liquid into said tube, said means comprising a skirt-like deflector member connected at its upper end to said tube and having a gas inlet mouth of substantially greater diameter than the inlet of said tube, said deflector forming a rim about said mouth forming a first drip collector ledge, said means including a second drip collector ledge disposed radially within and axially above said first ledge.

THEODORE A. ST. CLAIR.

REFERENCES CITED

The following references are of record in the file of this patent:

UNITED STATES PATENTS

| Number | Name | Date |
|---|---|---|
| 2,092,174 | Lithgow | Sept. 7, 1937 |
| 2,121,673 | White | June 21, 1938 |
| 2,440,230 | Buttner | Apr. 20, 1948 |
| 2,449,352 | White | Sept. 14, 1948 |
| 2,479,737 | Garretson | Aug. 23, 1949 |